(12) United States Patent
Kasai

(10) Patent No.: US 10,984,019 B2
(45) Date of Patent: Apr. 20, 2021

(54) DATA MANAGEMENT SYSTEM AND STORAGE MEDIUM

(71) Applicant: KYOCERA Document Solutions Inc., Osaka (JP)

(72) Inventor: Rie Kasai, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 166 days.

(21) Appl. No.: 16/232,017

(22) Filed: Dec. 25, 2018

(65) Prior Publication Data

US 2019/0205316 A1 Jul. 4, 2019

(30) Foreign Application Priority Data

Dec. 25, 2017 (JP) .............................. JP2017-248003

(51) Int. Cl.
| | |
|---|---|
| *G06F 16/28* | (2019.01) |
| *G06F 9/54* | (2006.01) |
| *G06K 9/62* | (2006.01) |
| *G06F 16/248* | (2019.01) |

(52) U.S. Cl.
CPC ............ *G06F 16/282* (2019.01); *G06F 9/542* (2013.01); *G06F 16/248* (2019.01); *G06K 9/6219* (2013.01)

(58) Field of Classification Search
CPC .. G06F 16/9577; G06F 40/106; G06F 16/358; G06F 16/904; G06F 16/954
USPC ........................................................ 707/797
See application file for complete search history.

(56) References Cited

U.S. PATENT DOCUMENTS 8,935,418 B2 * 1/2015 Knouse ................... H04L 63/10
709/229

FOREIGN PATENT DOCUMENTS

JP 2000-305834 A 11/2000

* cited by examiner

*Primary Examiner* — Hung T Vy
(74) *Attorney, Agent, or Firm* — Hawaii Patent Services; Nathaniel K. Fedde; Kenton N. Fedde

(57) ABSTRACT

To provide a data management system and a data management program enabling a person not having reference authority of a display name of a node of an ordinary hierarchical structure to refer to data associated with a node in an ordinary hierarchical structure, a data management system which, when one of the nodes of a hierarchical structure constituted by a plurality of nodes is specified, notifies at least some values of purchased product data associated with the specified node notifies the ordinary hierarchical structure to a person having reference authority of a display name of a node of the ordinary hierarchical structure, and notifies, to a person not having reference authority of the display name of the node of the ordinary hierarchical structure, a substitute hierarchical structure constituted by nodes of which value of at least one item of the purchased product data is the display name and with which purchased product data including this value is associated.

4 Claims, 23 Drawing Sheets

FIG. 4

24b NODE LIST

| NODE ID | NODE DISPLAY NAME | PARENT NODE | TELEPHONE NUMBER | PERSON IN CHARGE |
|---|---|---|---|---|
| NODE_01 | Top Node | – | – | – |
| NODE_02 | DEPARTMENT A | NODE_01 | – | – |
| NODE_03 | DEPARTMENT B | NODE_01 | – | – |
| NODE_04 | TEAM A | NODE_02 | – | – |
| NODE_05 | TEAM B | NODE_02 | – | – |
| NODE_06 | TEAM C | NODE_02 | – | – |
| NODE_07 | SHOP A | NODE_04 | 000-222-1111 | TARO YAMADA |
| NODE_08 | SHOP B | NODE_04 | 000-222-2222 | JIRO YAMADA |
| NODE_09 | SHOP C | NODE_05 | 000-222-3333 | SABURO YAMADA |
| NODE_10 | COMPANY D | NODE_05 | 000-222-4444 | SHIRO YAMADA |
| NODE_11 | SHOP E | NODE_06 | 000-222-5555 | GORO YAMADA |
| ... | ... | ... | ... | ... |

FIG. 5

24c PURCHASED PRODUCT LIST

| DATA ID | NODE ID | PRODUCT CATEGORY | MODEL NAME | SERIAL NUMBER | PURCHASE YEAR |
|---|---|---|---|---|---|
| DATA_0001 | NODE_07 | VACUUM CLEANER | B2015-A011 | ABC00000221 | 2016 |
| DATA_0002 | NODE_08 | VACUUM CLEANER | B2015-A011 | ABC00022226 | 2015 |
| DATA_0003 | NODE_09 | WASHING MACHINE | W2016-G010 | DEF64000271 | 2016 |
| DATA_0004 | NODE_07 | ELECTRIC FAN | F2015-T002 | ABC04500208 | 2017 |
| DATA_0005 | NODE_08 | WASHING MACHINE | W2017-F540 | GHI008762209 | 2014 |
| DATA_0006 | NODE_11 | ELECTRIC FAN | F2015-T002 | GHI008768411 | 2017 |
| DATA_0007 | NODE_10 | REFRIGERATOR | R2005-ZX110 | ABC00840213 | 2006 |
| ... | ... | ... | ... | ... | ... |

FIG. 6

24d AUTHORITY LIST

| AUTHORITY NAME | PRODUCT CATEGORY | MODEL NAME | SERIAL NUMBER | PURCHASE YEAR | NODE DISPLAY NAME | TELEPHONE NUMBER | PERSON IN CHARGE |
|---|---|---|---|---|---|---|---|
| MANAGER | PERMISSION | PERMISSION | PERMISSION | PERMISSION | PERMISSION | NONPERMISSION | NONPERMISSION |
| BUSINESS CHARGE | PERMISSION | PERMISSION | PERMISSION | PERMISSION | PERMISSION | PERMISSION | PERMISSION |
| ANALYST | PERMISSION | PERMISSION | NONPERMISSION | PERMISSION | NONPERMISSION | NONPERMISSION | NONPERMISSION |

24e USER LIST

| USER ID | BELONGING | AUTHORITY |
|---|---|---|
| User123 | NODE_01 | MANAGER |
| User456 | NODE_04 | BUSINESS CHARGE |
| User789 | NODE_02 | ANALYST |
| ⋮ | ⋮ | ⋮ |

FIG. 15A

SHOP A

| PRODUCT CATEGORY | MODEL NAME | SERIAL NUMBER | PURCHASE YEAR |
|---|---|---|---|
| VACUUM CLEANER | B2015-A011 | ABC00000221 | 2016 |
| ELECTRIC FAN | F2015-T002 | ABC04500208 | 2017 |

FIG. 15B

SHOP B

| PRODUCT CATEGORY | MODEL NAME | SERIAL NUMBER | PURCHASE YEAR |
|---|---|---|---|
| VACUUM CLEANER | B2015-A011 | ABC00022226 | 2015 |
| WASHING MACHINE | W2017-F540 | GHI008762209 | 2014 |

FIG. 16

SHOP A

| PRODUCT CATEGORY | MODEL NAME | SERIAL NUMBER | PURCHASE YEAR |
|---|---|---|---|
| VACUUM CLEANER | B2015-A011 | ABC00000221 | 2016 |
| ELECTRIC FAN | F2015-T002 | ABC04500208 | 2017 |

PERSON IN CHARGE : MR. TARO YAMADA

TELEPHONE NUMBER : 000-222-1111

FIG. 17

| PRODUCT CATEGORY | MODEL NAME | PURCHASE YEAR |
|---|---|---|
| VACUUM CLEANER | B2015-A011 | 2016 |
| VACUUM CLEANER | B2015-A011 | 2015 |

124f NODE DISPLAY ITEM PRIORITY LIST

| PRIORITY | PATTERN |
|---|---|
| 1 | MODEL NAME, PRODUCT CATEGORY |
| 2 | MODEL NAME |
| 3 | PRODUCT CATEGORY |
| 4 | PURCHASE YEAR |
| ⋮ | ⋮ |

FIG. 20

124g PRODUCT CATEGORY/MODEL NAME CORRESPONDENCE TABLE

| MODEL NAME | PRODUCT CATEGORY |
|---|---|
| B2015-A011 | VACUUM CLEANER |
| B2015-A012 | VACUUM CLEANER |
| B2016-A110 | VACUUM CLEANER |
| B2016-A111 | VACUUM CLEANER |
| ⋮ | ⋮ |
| F2015-T002 | ELECTRIC FAN |
| F2015-T003 | ELECTRIC FAN |
| F2015-T004 | ELECTRIC FAN |
| F2015-T005 | ELECTRIC FAN |
| F2015-T006 | ELECTRIC FAN |
| ⋮ | ⋮ |

FIG. 23A

| PRODUCT CATEGORY |
| --- |
| VACUUM CLEANER |
| ELECTRIC FAN |
| REFRIGERATOR |
| WASHING MACHINE |
| ⋮ |

FIG. 23B

VACUUM CLEANER

| MODEL NAME |
| --- |
| B2015-A011 |
| B2015-A012 |
| B2016-A110 |
| B2016-A111 |
| ⋮ |

DATA MANAGEMENT SYSTEM AND STORAGE MEDIUM

INCORPORATION BY REFERENCE

This application is based upon, and claims the benefit of priority from, corresponding Japanese Patent Application No. 2017-248003 filed in the Japan Patent Office on Dec. 25, 2017, the entire contents of which are incorporated herein by reference.

BACKGROUND

1. Field of the Invention

The present disclosure relates to a data management system that manages data, and also relates to a storage medium.

2. Description of Related Art

A related art data management system that manages data displays a hierarchical structure constituted by a plurality of nodes, each of which at least one piece of data is associated with, and when any node of the displayed hierarchical structure is specified, data associated with the specified node is displayed.

SUMMARY

A data management system according to the present disclosure includes: a data management unit capable of managing a plurality of pieces of data each of which includes a value for each item; a hierarchical structure notification unit that notifies a hierarchical structure constituted by a plurality of nodes each of which at least one piece of data is associated with; and a data notification unit that, when any of the nodes of the hierarchical structure notified by the hierarchical structure notification unit is designated, notifies the value of at least a part of the data associated with the designated node, wherein the hierarchical structure notification unit notifies an ordinary hierarchical structure to a person having reference authority of a display name of the node of the ordinary hierarchical structure as the ordinary hierarchical structure, notifies, as a substitute of the ordinary hierarchical structure, a substitute hierarchical structure to a person not having reference authority of the display name of the node of the ordinary hierarchical structure, and the substitute hierarchical structure is constituted by nodes of which value of at least one item is a display name and with which the data including this value is associated.

A non-transitory computer readable medium storing a data management program according to the present disclosure includes: a data management unit capable of managing a plurality of pieces of data each of which includes a value for each item; a hierarchical structure notification unit that notifies a hierarchical structure constituted by a plurality of nodes each of which at least one piece of data is associated with; and a data notification unit that, when any of the nodes of the hierarchical structure notified by the hierarchical structure notification unit is designated, notifies the value of at least a part of the data associated with the designated node, wherein the hierarchical structure notification unit, notifies an ordinary hierarchical structure to a person having reference authority of a display name of the node of the ordinary hierarchical structure as the ordinary hierarchical structure, notifies, as a substitute of the ordinary hierarchical structure, a substitute hierarchical structure to a person not having reference authority of the display name of the node of the ordinary hierarchical structure, and the substitute hierarchical structure is constituted by the nodes of which value of at least one item is a display name and with which the data including this value is associated.

BRIEF DESCRIPTION OF THE DRAWINGS

Brief Description of Drawings

Figure 1:
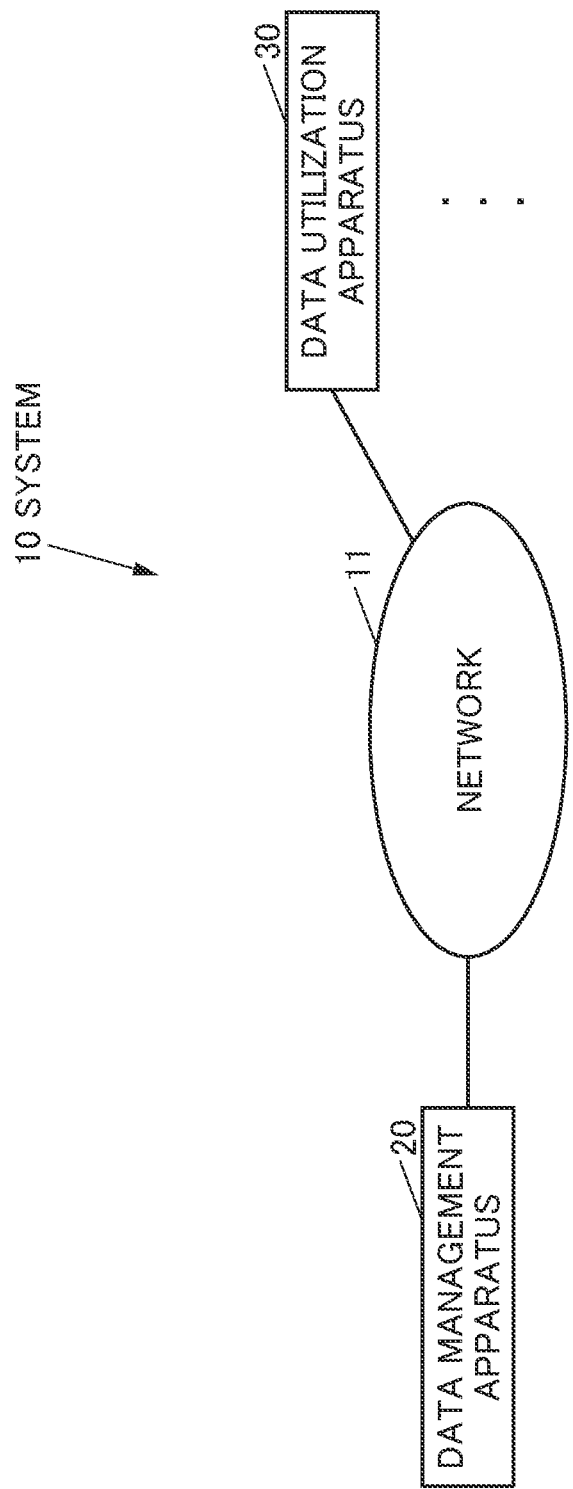
Figure 2:
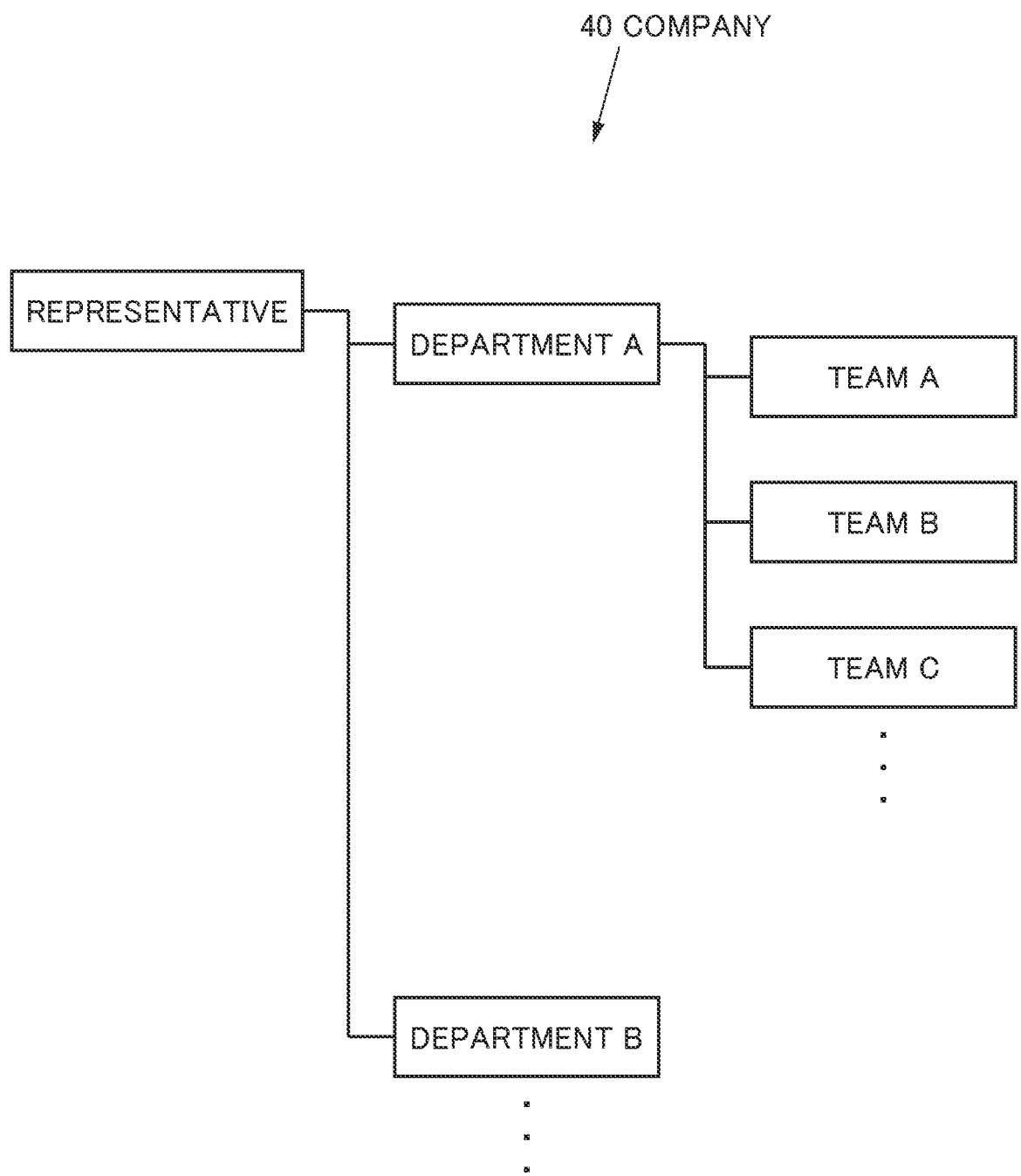
Figure 3:
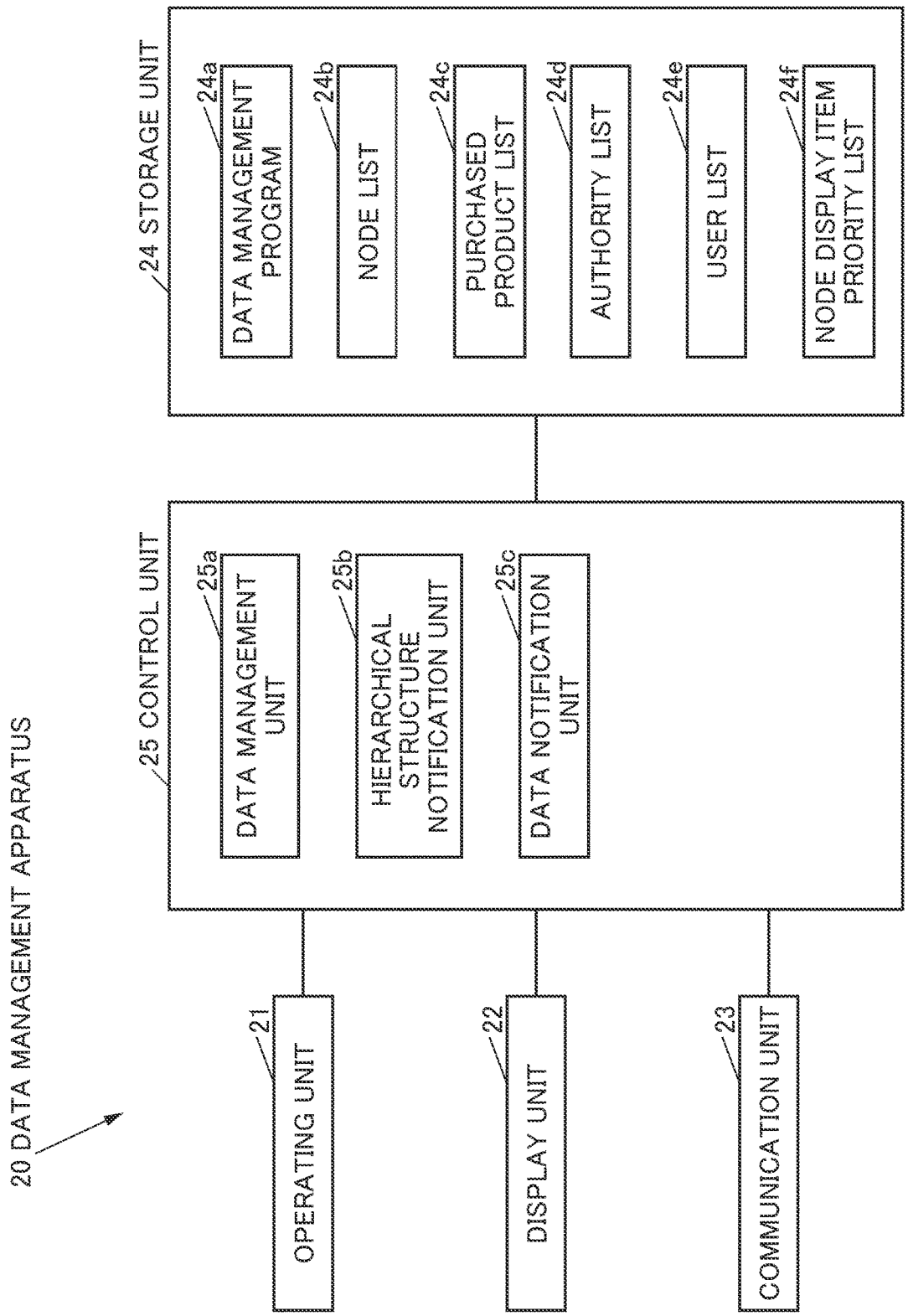
Figure 7:
Figure 8:
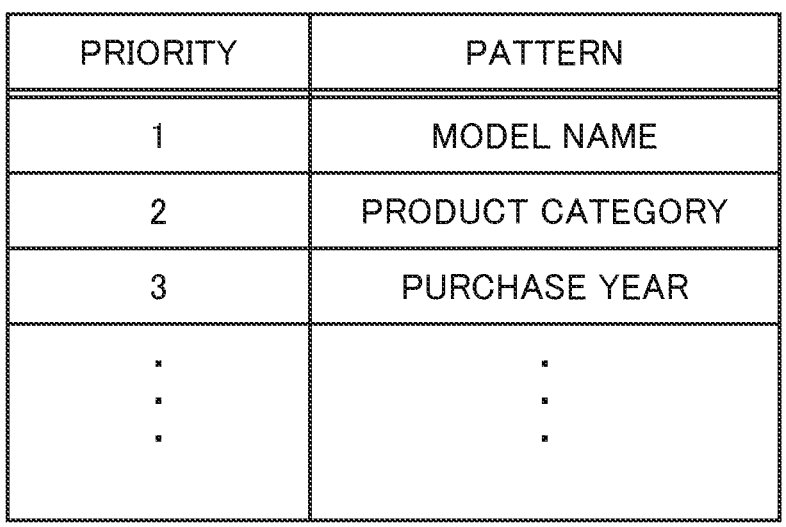
Figure 9:
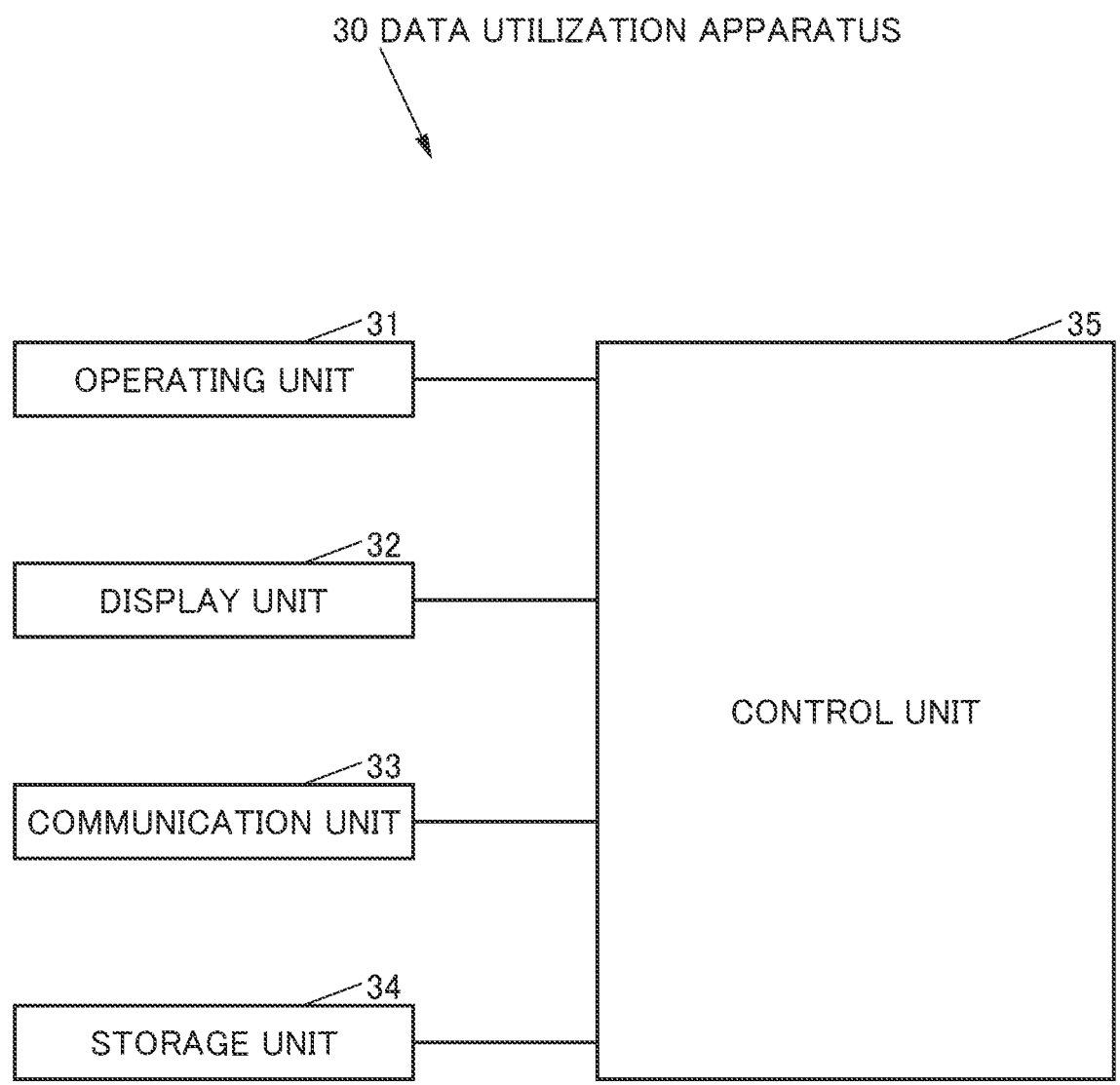
Figure 10:
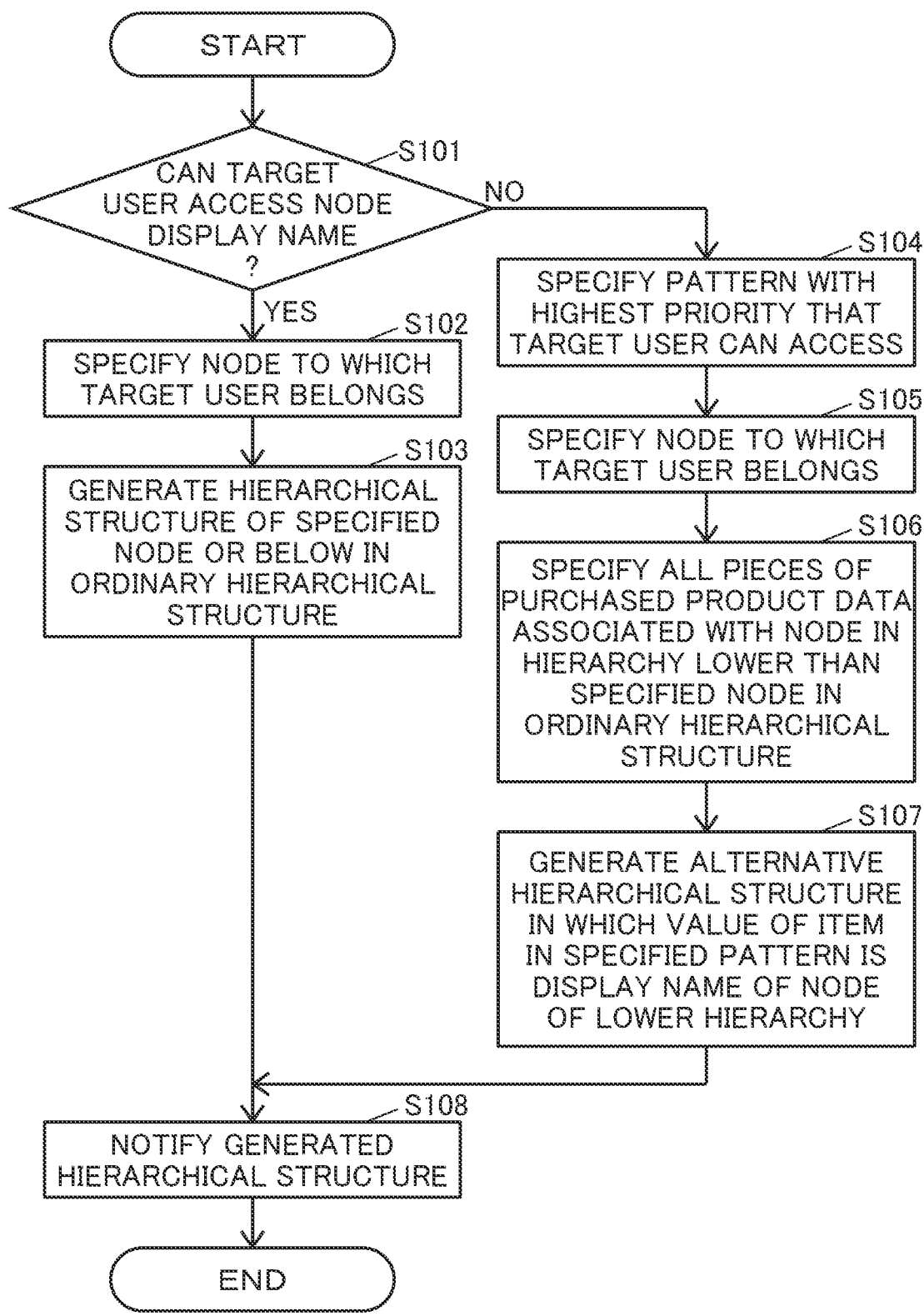
Figure 11:
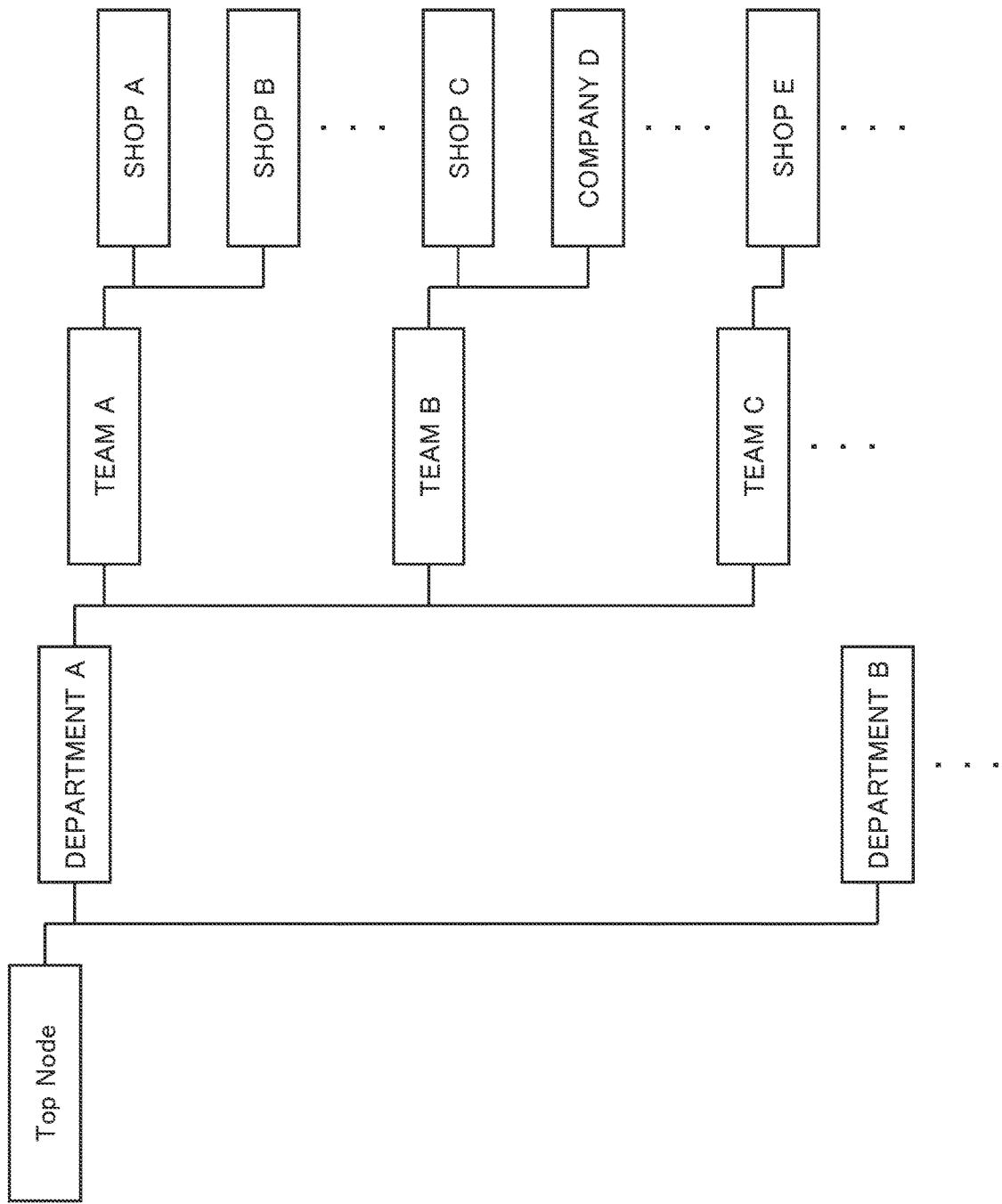
Figure 12:
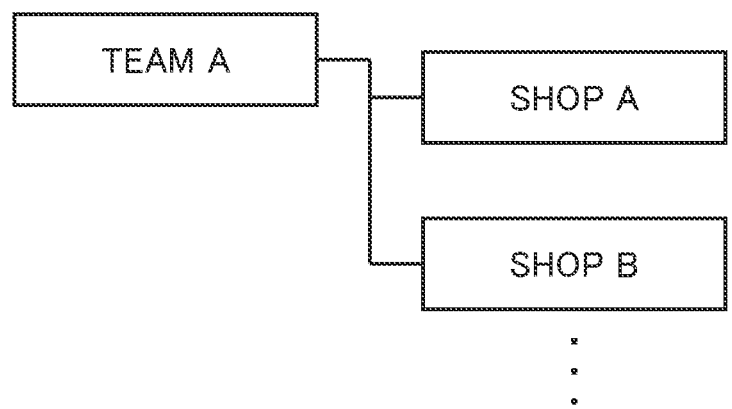
Figure 13:
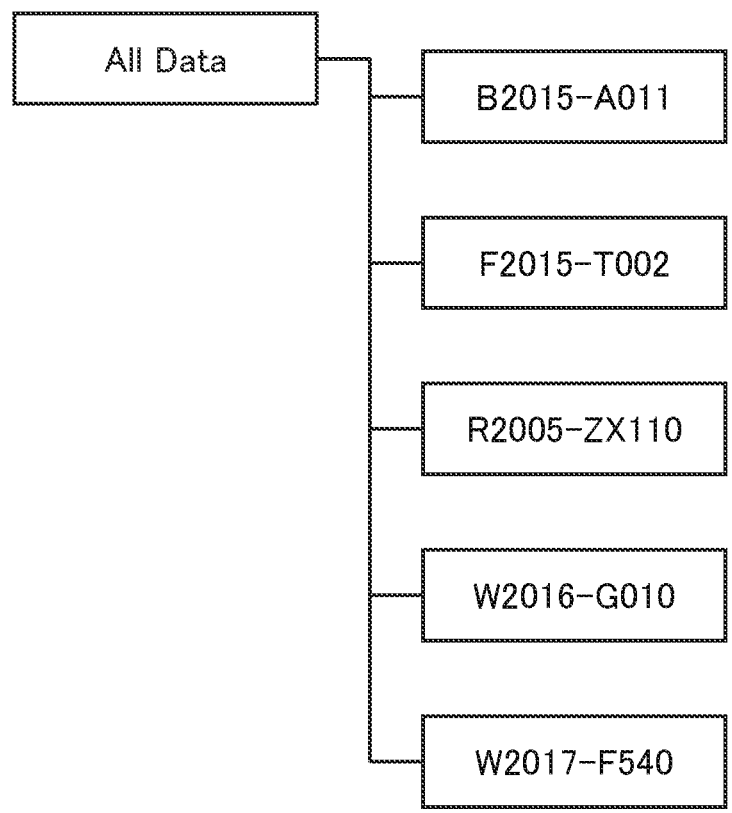
Figure 14:
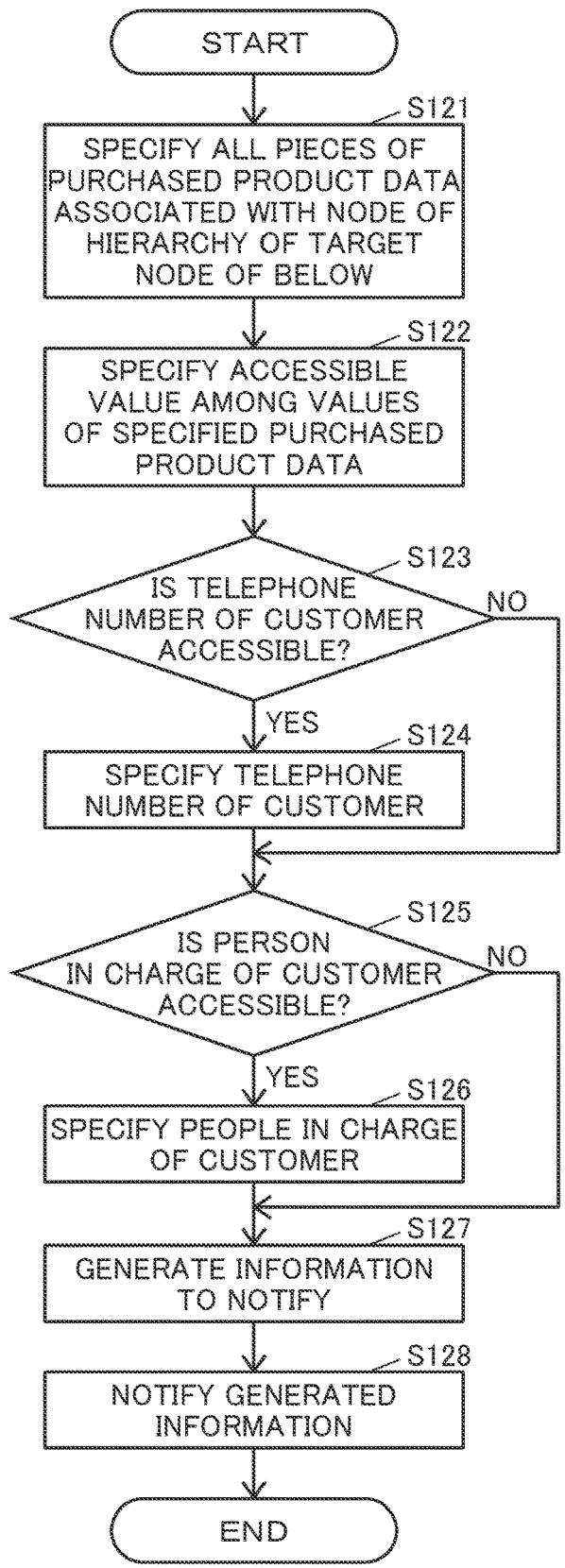
Figure 18:
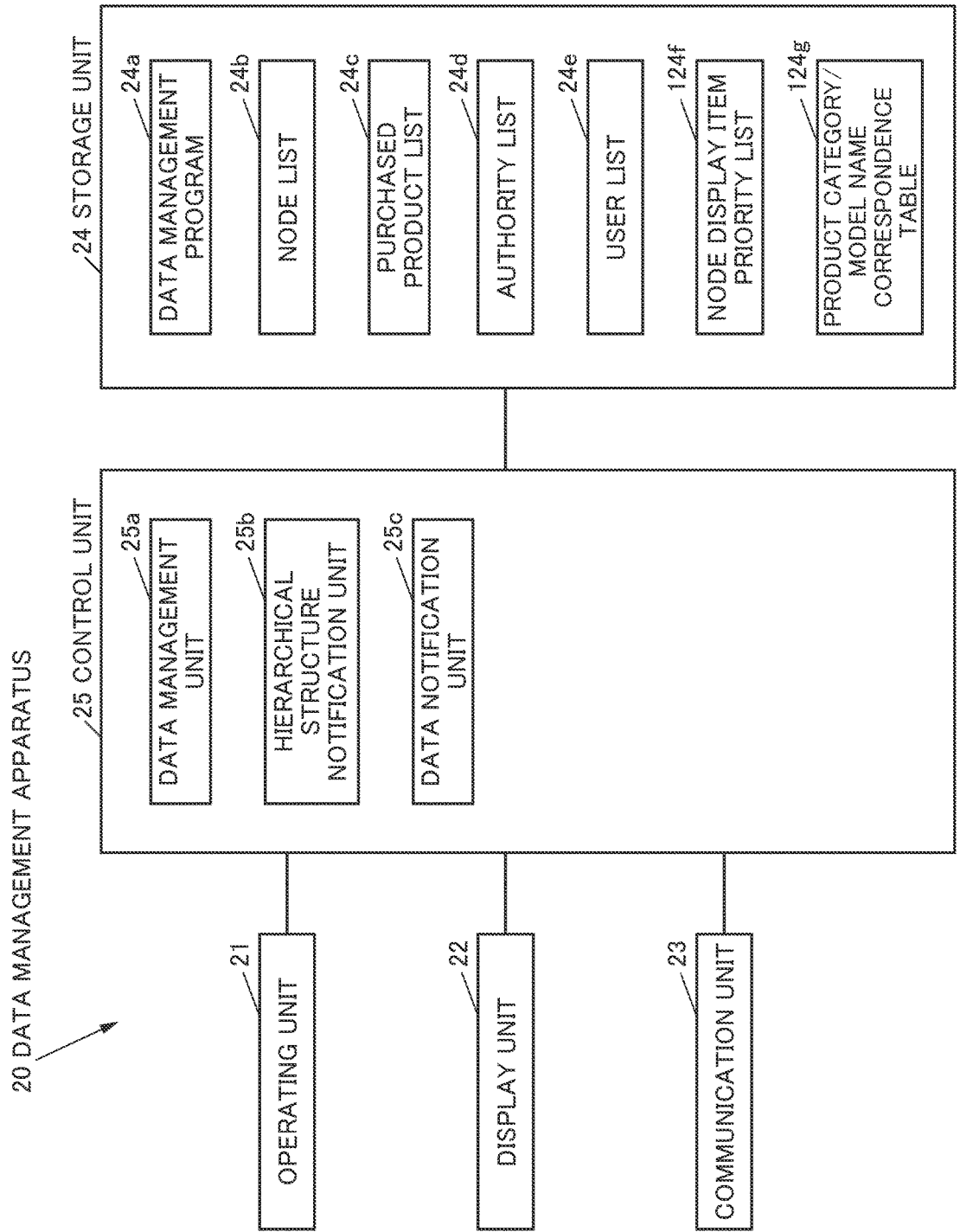
Figure 19:
Figure 21:
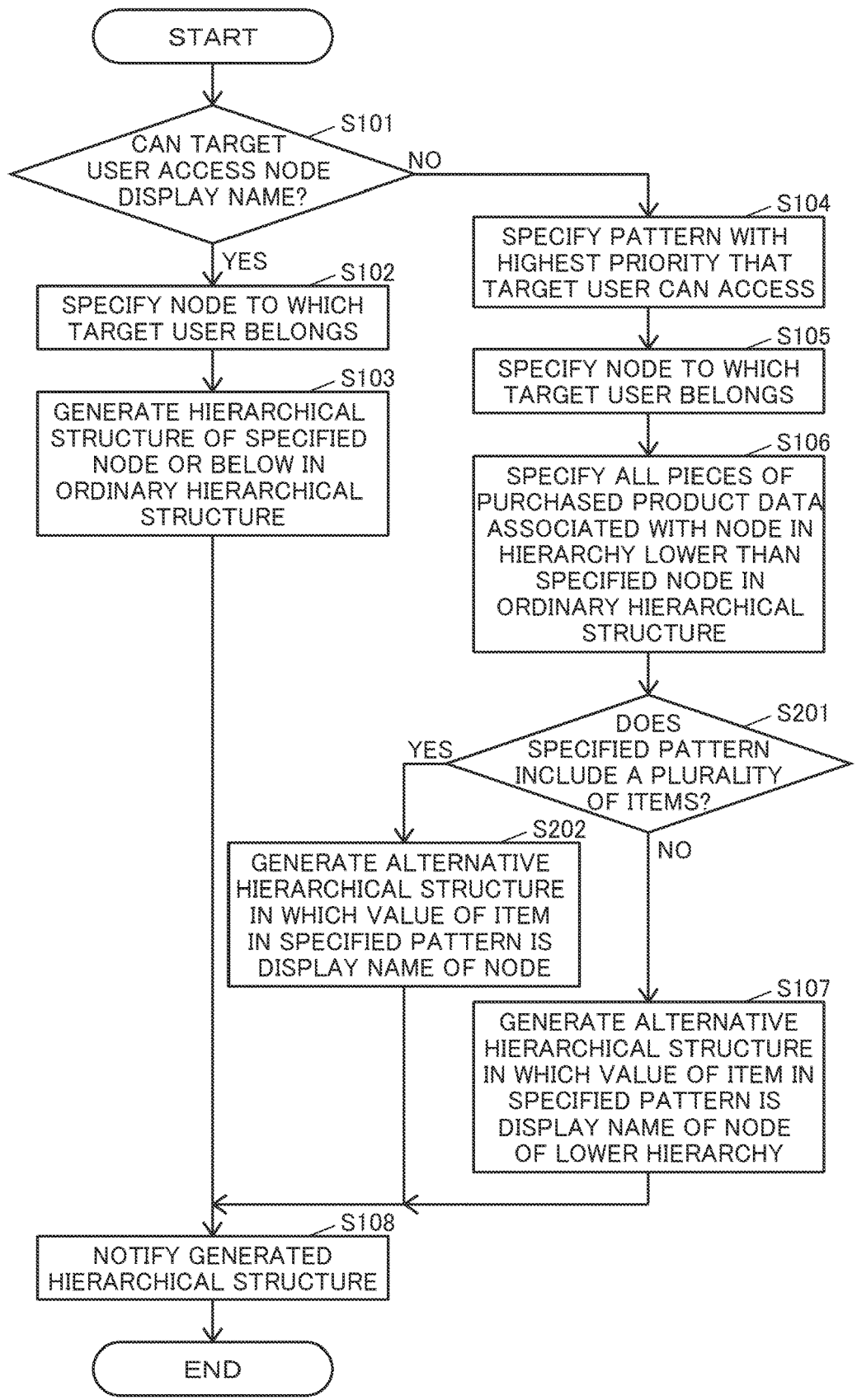
Figure 22:
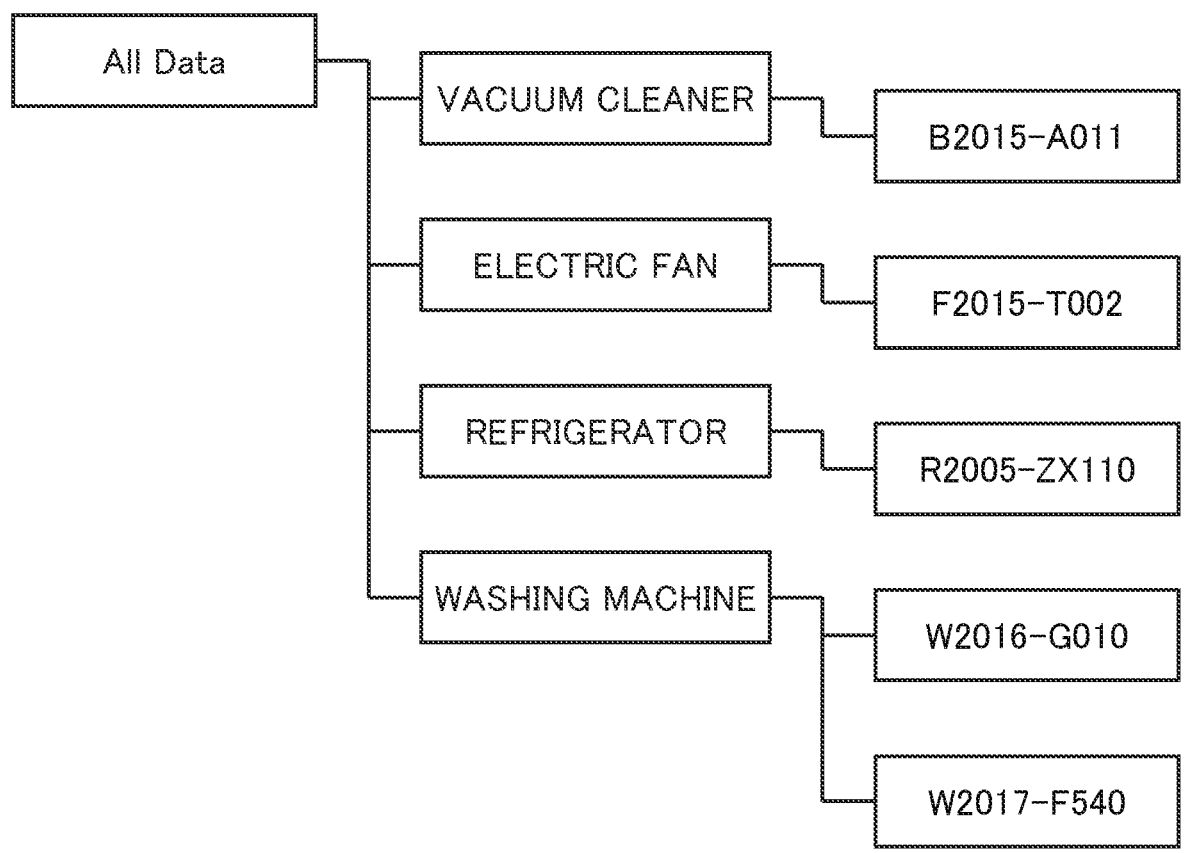

FIG. 1 is a block diagram of a system according to a first embodiment of the present disclosure;

FIG. 2 illustrates an organization of a company in which a data management apparatus illustrated in FIG. 1 is provided;

FIG. 3 is a block diagram of the data management apparatus illustrated in FIG. 1;

FIG. 4 illustrates an example of a node list illustrated in FIG. 3;

FIG. 5 illustrates an example of a purchased product list illustrated in FIG. 3;

FIG. 6 illustrates an example of an authority list illustrated in FIG. 3;

FIG. 7 illustrates an example of a user list illustrated in FIG. 3;

FIG. 8 illustrates an example of a node display item priority list illustrated in FIG. 3;

FIG. 9 is a block diagram of a data utilization apparatus illustrated in FIG. 1;

FIG. 10 is a flowchart of an operation of the data management apparatus illustrated in FIG. 3 when a hierarchical structure is to be notified;

FIG. 11 illustrates an example of a hierarchical structure displayed to a user with a user ID of "User123" by the data utilization apparatus illustrated in FIG. 9;

FIG. 12 illustrates an example of a hierarchical structure displayed to a user with a user ID of "User456" by the data utilization apparatus illustrated in FIG. 9;

FIG. 13 illustrates an example of a hierarchical structure displayed to a user with a user ID of "User789" by the data utilization apparatus illustrated in FIG. 9;

FIG. 14 is a flowchart of an operation of the data management apparatus illustrated in FIG. 3 when purchased product data is to be notified;

FIGS. 15A and 15B illustrate an example of information displayed to a user with a user ID of "User123" by the data utilization apparatus illustrated in FIG. 9;

FIG. 16 illustrates an example of information displayed to a user with a user ID of "User456" by the data utilization apparatus illustrated in FIG. 9;

FIG. 17 illustrates an example of information displayed to a user with a user ID of "User789" by the data utilization apparatus illustrated in FIG. 9;

FIG. 18 is a block diagram of a data management apparatus of a system according to a second embodiment of the present disclosure;

FIG. 19 illustrates an example of a node display item priority list illustrated in FIG. 18;

FIG. 20 illustrates an example of a product category/ model name correspondence list illustrated in FIG. 18;

FIG. 21 is a flowchart of an operation of the data management apparatus illustrated in FIG. 18 when a hierarchical structure is to be notified;

FIG. 22 illustrates an example of a hierarchical structure displayed to a user with a user ID of "User789" by a data utilization apparatus of the system according to the second embodiment of the present disclosure; and FIG. 23A illustrates an example of a product category list stored in a storage unit illustrated in FIG. 18, and FIG. 23B illustrates an example of a model name list for each product category stored in the storage unit illustrated in FIG. 18.

DETAILED DESCRIPTION

Embodiments of the present disclosure will be described with reference to the drawings.

First Embodiment

First, a structure of a system according to a first embodiment of the present disclosure will be described.

FIG. 1 is a block diagram of a system 10 according to the present embodiment.

The system 10 illustrated in FIG. 1 includes a data management apparatus 20 as a data management system that manages data, and a data utilization apparatus 30 for using data managed by the data management apparatus 20. Each of the data management apparatus 20 and the data utilization apparatus 30 may be, for example, a computer like a personal computer (PC).

The data management apparatus 20 and the data utilization apparatus 30 may communicate with each other via a network 11 like a local area network (LAN) and the Internet, or directly by using a cable or a wireless system not via the network 11.

The system 10 may include, other than the data utilization apparatus 30, at least one data utilization apparatus that is similar to the data utilization apparatus 30.

FIG. 2 illustrates an organization of a company 40 in which the data management apparatus 20 is provided.

The company 40 illustrated in FIG. 2 is a company that sells products to customers. The company 40 has a plurality of departments, like a department A and a department B. Hereinafter, the department A will be described, and explanations of other departments will be omitted.

The department A includes a plurality of teams, like a team A, a team B, and a team C. Each team can be in charge of at least one customer.

Data managed by the data management apparatus 20 illustrated in FIG. 1 is data of products purchased by a customer of each team of the company 40 (see FIG. 2) (hereinafter, referred to as "purchased product data").

The data utilization apparatus included in the system 10 is used by persons who belong to the company 40.

FIG. 3 is a block diagram of the data management apparatus 20.

As illustrated in FIG. 3, the data management apparatus 20 includes an operating unit 21 that is an input device like a keyboard and a mouse with which various operations are input, a display unit 22 that is a display device like a liquid crystal display (LCD) that displays various types of information, a communication unit 23 that communicates with outside devices via the network 11 (see FIG. 1) or directly by using a cable or a wireless system not via the network 11, a storage unit 24 that is a nonvolatile storage device like semiconductor memory and a hard disk drive that stores various types of information, and a control unit 25 that controls the entire data management apparatus 20.

The storage unit 24 stores a data management program 24a for managing the purchased product data. The data management program 24a may be, for example, installed in the data management apparatus 20 when the data management apparatus 20 is manufactured, may be additionally installed in the data management apparatus 20 from an outside storage medium such as universal serial bus (USB) flash memory, a compact disk (CD), and a digital versatile disk (DVD), or may be additionally installed in the data management apparatus 20 via the network 11.

The storage unit 24 stores a node list 24b indicating a list of nodes of an ordinary hierarchical structure as an ordinary hierarchical structure for displaying the purchased product data.

FIG. 4 illustrates an example of the node list 24b.

The node list 24b illustrated in FIG. 4 contains data for each node. Each piece of the data of the node list 24b contains values for each of a plurality of items. The items of the node list 24b include a "node ID" as node identification information, a display name of a node (hereinafter, referred to as a "node display name"), a "parent node" immediately upper hierarchy in an ordinary hierarchy, a "telephone number" of a customer associated with the node, and a "person in charge" of the customer associated with the node.

In the node list 24b illustrated in FIG. 4, a node with a node ID of "NODE_01" is a node in the highest hierarchy in the ordinary hierarchical structure. Therefore, no parent node exists in the node with the node ID of "NODE_01."

In the node list 24b illustrated in FIG. 4, the node with the node ID of "NODE_01" does not correspond to a customer. A node with a node ID of "NODE_02," a node with a node ID of "NODE_03," a node with a node ID of "NODE_04," a node with a node ID of "NODE_05," and a node with a node ID of "NODE_06" correspond to a department A, a department B, a team A, a team B, and a team C of the company 40, respectively, and does not correspond to a customer. Therefore, no telephone number nor person in charge associated with the node list 24b exists in each of the node with the node ID of "NODE_01, the node with the node ID of "NODE_02," the node with the node ID of "NODE_03," the node with the node ID of "NODE_04," the node with the node ID of "NODE_05," and the node with the node ID of "NODE_06."

A content of data of each node of the node list 24b is changed by a person having authority of changing the content of data of each node of the node list 24b. For example, the content of data of the node corresponding to the customer among the nodes of the node list 24b is changed by a person having authority of later-described "business charge" with respect to the customer.

As illustrated in FIG. 3, the storage unit 24 stores a purchased product list 24c indicating a list of products purchased by a customer of each team of the company 40 (see FIG. 2).

FIG. 5 illustrates an example of the purchased product list 24c.

Each piece of data of the purchased product list 24c illustrated in FIG. 5 contains values for each of a plurality of items. The purchased product list 24c includes "node IDs" indicating nodes corresponding to customers who purchased products in the node list 24b (see FIG. 4) and the purchased product data. The items of the purchased product data include a "data ID" as identification information of the purchased product data, a "product category" indicating a category of the product purchased by the customer, a "model name" of the product purchased by the customer, a "serial number" of the product purchased by the customer, and a "purchase year" of the product purchased by the customer. A content of the purchased product list 24c is changed by a person having authority of changing the content of the purchased product list 24c, e.g., a person having authority of later-described "business charge." However, when the purchased product data is added to the purchased product list 24c, the data ID is automatically added to the purchased product list 24c by a later-described data management unit 25a.

As illustrated in FIG. 3, the storage unit 24 stores an authority list 24d indicating a list of authorities of users of the data management apparatus 20.

FIG. 6 illustrates an example of the authority list 24d.

The authority list 24d illustrated in FIG. 6 contains data for each authority. Each piece of data of the authority list 24d contains values for each of a plurality of items. The items of the authority list 24d include an "authority name" for identifying authorities, a "product category" indicating whether the product category of the purchased product list 24c is accessible (see FIG. 5), a "model name" indicating whether the model name of the purchased product list 24c is accessible, a "serial number" indicating whether the serial number of the purchased product list 24c is accessible, a "purchase year" indicating whether the purchase year of the purchased product list 24c is accessible, a "node display name" indicating whether the node display name of the node list 24b (see FIG. 4) is accessible, a "telephone number" indicating whether the telephone number of the node list 24b is accessible, and a "person in charge" indicating whether the person in charge of the node list 24b is accessible. A content of the authority list 24d may be previously fixed, or may be changed by a person having authority of changing the content of the authority list 24d.

An "analyst" is a person who analyzes the purchased product data of a customer. For example, an "analyst" can analyze a model name of a product and how many the product sells.

As illustrated in FIG. 3, the storage unit 24 stores a user list 24e indicating a list of users of the data management apparatus 20.

FIG. 7 illustrates an example of the user list 24e.

The user list 24e illustrated in FIG. 7 contains data for each user. Each piece of data of the user list 24e contains values for each of a plurality of items. The items of the user list 24e include a "user ID" as identification information of a user, "belongings" indicating a node to which the user belongs in the ordinary hierarchical structure, and an "authority" of the user. A content of the user list 24e is changed by a person having authority of changing the content of the user list 24e, e.g., a person having authority of adding or deleting a user of the data management apparatus 20.

As illustrated in FIG. 3, the storage unit 24 stores a node display item priority list 24f as pattern information indicating a plurality of patterns of the single item of the purchased product data in association with priority.

FIG. 8 illustrates an example of the node display item priority list 24f.

The node display item priority list 24f illustrated in FIG. 8 indicates a plurality of patterns of the single item of the purchased product data, and priority in these patterns. Desirably, a pattern with higher priority included in the node display item priority list 24f desirably has higher specificity level. Also in the example illustrated in FIG. 8, specificity level becomes lower as priority becomes lower: i.e., the "model name," the "product category," and the "purchase year" in this order. Generally, items with high specificity level are also high in secrecy level, but these items are suitable to be classified, i.e., used as nodes as compared with items with low specificity level, i.e., items with high abstraction level. A content of the node display item priority list 24f may be previously fixed, or may be changed by a person having authority of changing the content of the node display item priority list 24f.

The control unit 25 illustrated in FIG. 3 includes, for example, a central processing unit (CPU), read only memory (ROM) storing a program and various types of data, and random access memory (RAM) used as a working area of the CPU. The CPU executes a program stored in the ROM or in the storage unit 24.

The control unit 25 executes the data management program 24a to implement a data management unit 25a that manages the purchased product data, a hierarchical structure notification unit 25b that notifies a hierarchical structure, and a data notification unit 25c which notifies at least some values of the purchased product data associated with the specified node when any node of the hierarchical structure notified by the hierarchical structure notification unit 25b is specified.

FIG. 9 is a block diagram of the data utilization apparatus 30.

As illustrated in FIG. 9, the data utilization apparatus 30 includes an operating unit 31 that is an input device like a keyboard and a mouse with which various operations are input, a display unit 32 that is a display device like LCD that displays various types of information, a communication unit 33 that communicates with outside devices via the network 11 (see FIG. 1) or directly by using a cable, or wirelessly without using the network 11, a storage unit 34 that is a nonvolatile storage device like semiconductor memory and HDD that stores various types of information, and a control unit 35 that controls the entire data utilization apparatus 30.

The control unit 35 includes, for example, a CPU, ROM storing a program and various types of data, and RAM used as a working area of the CPU. The CPU executes a program stored in the ROM or in the storage unit 34.

Next, an operation of the system 10 will be described.

First, an operation of the system 10 when the hierarchical structure to display the purchased product data is to be displayed will be described.

A user of the data management apparatus 20 (hereinafter, referred to as a "target user" in the description of the operation of the system 10 when the hierarchical structure is to be displayed) can log in to the data management apparatus 20 via the operating unit 31 of the data utilization apparatus 30 by using a user ID of the target user. When the hierarchical structure notification unit 25b of the data management apparatus 20 permits login of the target user, an operation illustrated in FIG. 10 is performed.

FIG. 10 is a flowchart of an operation of the data management apparatus 20 when the hierarchical structure is to be notified.

As illustrated in FIG. 10, the hierarchical structure notification unit 25b of the data management apparatus 20 determines whether the target user can access the node display name of the node list 24b based on the user ID of the target user (hereinafter, referred to as a "target user ID" in the description of the operation illustrated in FIG. 10), the authority list 24d, and the user list 24e (S101). Here, that the target user can access the node display name of the node list 24b means that the target user having reference authority of the node display name of the ordinary hierarchical structure.

When it is determined in S101 that the target user can access the node display name of the node list 24b, the hierarchical structure notification unit 25b specifies a node to which the target user belongs in the ordinary hierarchical structure based on the target user ID and the user list 24e (S102).

Then, the hierarchical structure notification unit 25*b* generates, based on the node list 24*b*, a hierarchical structure of the node specified in S102 or below in the ordinary hierarchical structure (S103).

When it is determined in S101 that the target user cannot access the node display name of the node list 24*b*, the hierarchical structure notification unit 25*b* specifies a pattern with highest priority from among patterns of items of the purchased product data accessible to the target user, based on the target user ID, the authority list 24*d*, the user list 24*e*, and the node display item priority list 24*f* (S104). Here, a pattern of items of the purchased product data accessible to the target user is a pattern of items of the purchased product data for which the target user having reference authority of values.

Next, the hierarchical structure notification unit 25*b* specifies the node to which the target user belongs in the ordinary hierarchical structure based on the target user ID and the user list 24*e* (S105).

Next, the hierarchical structure notification unit 25*b* specifies all pieces of the purchased product data in the ordinary hierarchical structure associated with a node in the hierarchy of the node specified in S102 or below based on the node list 24*b* and the purchased product list 24*c* (S106).

Next, the hierarchical structure notification unit 25*b* generates the hierarchical structure in which a value of an item in the pattern specified in S104 is the display name and in which the node with which the purchased product data including this value is associated is the node of the lowest hierarchy, as a substitute of the ordinary hierarchical structure, i.e., a substitute hierarchical structure based on the purchased product data specified in S106 (S107).

When the process of S103 or S107 is finished, the hierarchical structure notification unit 25*b* notifies the data utilization apparatus 30 of the hierarchical structure generated in S103 or S107 (S108), and the operation illustrated in FIG. 10 is finished.

When the hierarchical structure is notified from the data management apparatus 20, the control unit 35 of the data utilization apparatus 30 displays, on the display unit 32, the hierarchical structure notified from the data management apparatus 20.

FIG. 11 illustrates an example of the hierarchical structure displayed by the data utilization apparatus 30 to the user with a user ID of "User123."

Since the user with the user ID "User123" is a "manager" according to the user list 24*e*, the user can access the node display name of the node list 24*b* according to the authority list 24*d*. That is, the hierarchical structure notification unit 25*b* determines in S101 that the user with the user ID of "User123" can access the node display name of the node list 24*b*. According to the user list 24*e*, the user with the user ID of "User123" belongs to the node with the node ID of "NODE_01" in the ordinary hierarchical structure. That is, the hierarchical structure notification unit 25*b* specifies the node with the node ID of "NODE_01" in S102. Therefore, the hierarchical structure notification unit 25*b* generates in S103 a hierarchical structure of the node with the node ID of "NODE_01" or below in the ordinary hierarchical structure as the hierarchical structure notified to the data utilization apparatus 30 with respect to the user with the user ID of "User123."

FIG. 12 illustrates an example of the hierarchical structure displayed by the data utilization apparatus 30 to the user with a user ID of "User456."

Since the user with the user ID of "User456" is a "business charge" according to user list 24*e*, the user can access the node display name of the node list 24*b* according to the authority list 24*d*. That is, the hierarchical structure notification unit 25*b* determines in S101 that the user with the user ID of "User456" can access the node display name of the node list 24*b*. According to the user list 24*e*, the user with the user ID of "User456" belongs to the node with the node ID of "NODE_04" in the ordinary hierarchical structure. That is, the hierarchical structure notification unit 25*b* specifies the node with the node ID of "NODE_04" in S102. Therefore, the hierarchical structure notification unit 25*b* generates in S103 a hierarchical structure of the node with the node ID of "NODE_01" or below in the ordinary hierarchical structure as the hierarchical structure notified to the data utilization apparatus 30 with respect to the user with the user ID of "User456."

FIG. 13 illustrates an example of the hierarchical structure displayed by the data utilization apparatus 30 to the user with the user ID of "User789."

Since the user with the user ID of "User789" is an "analyst" according to the user list 24*e*, the user cannot access the node display name of the node list 24*b* according to the authority list 24*d*. That is, the hierarchical structure notification unit 25*b* determines in S101 that the user with the user ID of "User789" cannot access the node display name of the node list 24*b*. The pattern with highest priority among patterns of items of the purchased product data that the user with the user ID of "User789" which is the "analyst" can access is the pattern of priority "1" according to the authority list 24*d* and the node display item priority list 24*f* That is, the hierarchical structure notification unit 25*b* specifies a pattern of priority "1" in the node display item priority list 24*f* in S104. According to the user list 24*e*, the user with the user ID of "User789" belongs to the node with the node ID of "NODE_02" in the ordinary hierarchical structure. That is, the hierarchical structure notification unit 25*b* specifies the node with the node ID of "NODE_02" in S105, and specifies in S106 all pieces of the purchased product data associated with the node in the hierarchy of the node with the node ID of "NODE_02" or below in the ordinary hierarchical structure. Therefore, in S107, the hierarchical structure notification unit 25*b* generates, as the hierarchical structure notified to the data utilization apparatus 30 with respect to the user with the user ID of "User789," based on all pieces of the purchased product data associated with all node in the hierarchy of the node with the node ID "NODE_02" or below in the ordinary hierarchical structure as illustrated in FIG. 13, a substitute hierarchical structure constituted by nodes of which item in the pattern of priority "1" in the node display item priority list 24*f*, i.e., a value of "model name" is the display name, and with which the purchased product data including this value is associated.

In the hierarchical structure illustrated in FIG. 13, "All Data" which is a node in the highest hierarchy is among values of all pieces of the purchased product data associated with the node in the hierarchy of the node with the node ID of "NODE_02" in the ordinary hierarchical structure, a node to notify all values that the user with the user ID of "User789" can refer to.

Next, an operation of the system 10 when the purchased product data is to be displayed is described.

When the hierarchical structure is displayed on the display unit 32, a user of the data management apparatus 20 (hereinafter, referred to as a "target user" in the description of an operation of the system 10 when the purchased product data is to be displayed) can instruct the data utilization apparatus 30 to display all pieces of the purchased product data associated with the node in the hierarchy of the specified node (hereinafter, referred to as a "target node" in the description of an operation of the system 10 when the purchased product data is to be displayed) or below by specifying any node in the hierarchical structure displayed on the display unit 32 via the operating unit 31. When display of all pieces of the purchased product data associated with the node in the hierarchy of the target node or below is instructed via the operating unit 31, the control unit 35 of the data utilization apparatus 30 requests all pieces of the purchased product data associated with the node of the hierarchy of the target node or below to the data management apparatus 20. When all pieces of the purchased product data associated with the node of the hierarchy of the target node or below are requested, the hierarchical structure notification unit 25b of the data management apparatus 20 performs the operation illustrated in FIG. 14.

FIG. 14 is a flowchart of an operation of the data management apparatus 20 when it is notified of purchased product data.

As illustrated in FIG. 14, the data notification unit 25c of the data management apparatus 20 specifies, in the hierarchical structure notified in S108, all pieces of the purchased product data associated with the node in the hierarchy of the target node or below based on the node list 24b and the purchased product list 24c (S121).

Next, the data notification unit 25c specifies a value accessible to the target user among the values of the purchased product data specified in S121 based on the user ID of the target user (hereinafter, referred to as a "target user ID" in the description of the operation illustrated in FIG. 14), the authority list 24d, and the user list 24e (S122).

Then, the data notification unit 25c determines whether the target user can access the telephone number of the customer based on the target user ID, the authority list 24d, and the user list 24e (S123).

When it is determined in S123 that the target user can access the telephone number of the customer, the data notification unit 25c specifies the value of the item "telephone number" of all the nodes corresponding to the customers among the nodes in the hierarchy of the target node or below (S124).

When it is determined in S123 that the target user cannot access the telephone number of the customer or when the process of S124 is finished, the data notification unit 25c determines whether the target user can access the person in charge of the customer based on the target user ID, the authority list 24d, and the user list 24e (S125).

When it is determined in S125 that the target user can access the person in charge of the customer, the data notification unit 25c specifies the value of the item "person in charge" of all the nodes corresponding to the customers among the nodes in the hierarchy of the target node or below (S126).

When it is determined in S125 that the target user cannot access the person in charge of the customer or when the process of S126 is finished, the data notification unit 25c generates information to notify to the data utilization apparatus 30 based on the value specified in S122 (S127). Here, when the data notification unit 25c has specified the value of the item "telephone number" in S124, the data notification unit 25c also generates information to notify to the data utilization apparatus 30 based on the value of the item "telephone number" specified in S124. Also, when the data notification unit 25c has specified the value of the item "person in charge" in S126, the data notification unit 25c also generates information to notify to the data utilization apparatus 30 based on the value of the item "person in charge" specified in S126.

Next, the data notification unit 25c notifies data utilization apparatus 30 of information generated in S127 (S128) and finishes the operation illustrated in FIG. 14.

When information is notified from the data management apparatus 20, the control unit 35 of the data utilization apparatus 30 displays the information notified from the data management apparatus 20 on the display unit 32.

FIGS. 15A and 15B illustrate an example of information displayed by the data utilization apparatus 30 to the user with the user ID of "User123."

When the hierarchical structure illustrated in FIG. 11 is displayed on the display unit 32, the user with the user ID of "User123" display of all pieces of the purchased product data associated with the node in the hierarchy of the node "team A" or below can be instructed to the data utilization apparatus 30 by specifying the node "team A" via the operating unit 31. According to the user list 24e, the user with the user ID of "User123" is a "manager." Therefore, according to the authority list 24d, the user can access values of items of the purchased product list 24c "product category," "model name," "serial number," and "purchase year," but, cannot access values of items of the node list 24b "telephone number" and "person in charge." Therefore, as the information to be notified to the data utilization apparatus 30 with respect to the user with the user ID of "User123," as illustrated in FIGS. 15A and 15B, the data notification unit 25c generates in S127 information based on all values of all pieces of the purchased product data associated with the node in the hierarchy of the node of "team A" or below in the ordinary hierarchical structure.

FIG. 16 illustrates an example of information displayed by the data utilization apparatus 30 to the user with the user ID of "User456."

When the hierarchical structure illustrated in FIG. 12 is displayed on the display unit 32, the user with the user ID of "User456" can instruct the data utilization apparatus 30 to display of all pieces of the purchased product data associated with the node in the hierarchy of the node "shop A" or below by specifying the node "shop A" via the operating unit 31. According to the user list 24e, the user with the user ID "User456" is a "business charge." Therefore, according to the authority list 24d, the user can access the values of items of the purchased product list 24c "product category," "model name," "serial number," and "purchase year" and the values of the items of the node list 24b "telephone number" and "person in charge." Therefore, as the information to be notified to the data utilization apparatus 30 with respect to the user with the user ID of "User456," as illustrated in FIG. 16, the data notification unit 25c generates in S127 information based on all values of all pieces of the purchased product data associated with the node in the hierarchy of the node of "shop A" or below in the ordinary hierarchical structure and values of "telephone number" and "person in charge" of "shop A."

FIG. 17 illustrates an example of information displayed by the data utilization apparatus 30 to the user with the user ID of "User789."

When the hierarchical structure illustrated in FIG. 13 is displayed on the display unit 32, the user with the user ID of "User789" can instruct the data utilization apparatus 30 to display all pieces of the purchased product data associated with the node in the hierarchy of the node "B2015-A011" or below by specifying the node "B2015-A011" via the operating unit 31. As described above, the hierarchical structure illustrated in FIG. 13 is generated based on all pieces of the purchased product data associated with the node in the hierarchy of the node with the node ID of "NODE_02 or below in the ordinary hierarchical structure. According to the user list 24e, the user with the user ID of "User789" is an "analyzer." According to the authority list 24d, the user can access the values of the items of the purchased product list 24c "product category," "model name," and "purchase year," but cannot access the value of the item of the purchased product list 24c "serial number," the values of the items "telephone number" and "person in charge" of the node list 24b. Therefore, as the information to be notified from the data utilization apparatus 30 to the user with the user ID of "User789," as illustrated in FIG. 17, the data notification unit 25c generates in S127 information based on values of items of all pieces of the purchased product data of which "model name" is "B2015-A011" associated with the node in the hierarchy of the node with the node ID of "NODE_02" in the ordinary hierarchical structure, i.e., "product category," "model name," and "the purchase year."

When the hierarchical structure is displayed on the display unit 32, the user of authority "business charge" can instruct the data utilization apparatus 30 to edit the purchased product data via the operating unit 31 of the data utilization apparatus 30. When editing of the purchased product data is instructed via the operating unit 31, the control unit 35 of the data utilization apparatus 30 requests editing of the purchased product data to the data management apparatus 20. When editing of the purchased product data is required, the data management unit 25a of the data management apparatus 20 edits the purchased product data. Here, editing of the purchased product data includes addition, deletion, change, etc. of the purchased product data.

As described in the above the, data management apparatus 20 notifies to a person not having reference authority of the node display name of the ordinary hierarchical structure, as a substitute of the ordinary hierarchical structure, a hierarchical structure constituted by nodes of which a value of at least one item of the purchased product data is the display name, and with which the purchased product data including this value is associated (S107 and S108). Therefore, a person not having reference authority of the node display name of the ordinary hierarchical structure can refer to the purchased product data associated with the node of the ordinary hierarchical structure.

The data management apparatus 20 notifies to a person not having reference authority of the node display name of the ordinary hierarchical structure, as a substitute of the ordinary hierarchical structure, a hierarchical structure constituted by nodes of which the value that this person having reference authority of is the display name among the values of the items of the purchased product data, and with which the purchased product data including this value is associated. Therefore, it is possible to notify all the node of the substitute hierarchical structure, which improves convenience.

When notifying a person not having reference authority of the node display name of the ordinary hierarchical structure of a substitute hierarchical structure, the data management apparatus 20 notifies the hierarchical structure with highest priority among the hierarchical structures that this person can refer to all the nodes thereof, which improves convenience.

The data management apparatus 20 notifies to a person not having reference authority of the node display name of the ordinary hierarchical structure, as a substitute of the ordinary hierarchical structure, a hierarchical structure is constituted by nodes of which value of at least one item of the purchased product data is the display name, and which with which the purchased product data including this value is associated. Therefore, when the node display name of the ordinary hierarchical structure includes information that should not be displayed to a certain person, i.e., private information, the data management apparatus 20 can notify a hierarchical structure not displaying information that should not be displayed to a certain person.

The data management apparatus 20 notifies also to a person not having reference authority of the node display name of the ordinary hierarchical structure, as a substitute of the ordinary hierarchical structure, a hierarchical structure in which a value of at least one item of the purchased product data is the display name. Therefore, in comparison with a case in which all pieces of the purchased product data are notified without categorize, confirmation of the purchased product data can be made easy.

If the data management apparatus 20 can notify to a person not having reference authority of the node display name of the ordinary hierarchical structure, as a substitute of the ordinary hierarchical structure, a hierarchical structure constituted by nodes of which a value of at least one item of the purchased product data is the display name, and with which the purchased product data including this value is associated, even if the number of types of the values of any items of the purchased product data increases, it cannot become impossible to notify the substitute hierarchical structure.

Further, if the data management apparatus 20 can notify to person not having reference authority of node display name of ordinary hierarchical structure, as a substitute of the ordinary hierarchical structure, a hierarchical structure constituted by nodes of which value of at least one item of the purchased product data is the display name, and with which the purchased product data including this value is associated, when the type of authority included in the authority list 24d is newly increased and it becomes impossible to notify the substitute hierarchical structure to the person with newly increased authority, it is possible to notify the substitute hierarchical structure to the person who is newly authorized by appropriately changing the node display item priority list 24f.

Second Embodiment

First, a structure of a system according to a second embodiment of the present disclosure will be described.

Of the constituent elements of the system according to the present embodiment, the same constituent elements as those of the system 10 (see FIG. 1) according to the first embodiment are denoted by the same reference numerals as those of the constituent elements of the system 10 and detailed description thereof will be omitted.

A configuration of the system according to the present embodiment is the same as that of the system 10 except for the configuration described below.

FIG. 18 is a block diagram of a data management apparatus 20 of the system according to the present embodiment.

As illustrated in FIG. 18, the storage unit 24 of the data management apparatus 20 according to the present embodiment stores a node display item priority list 124f indicating, in association with priority, at least one pattern of a single item of purchased product data and at least one pattern of a combination of a plurality of items among items of purchased product data in substitution of the node display item priority list 24f (see FIG. 3)

FIG. 19 illustrates an example of a node display item priority list 124*f*.

The node display item priority list 124*f* illustrated in FIG. 19 indicates at least one pattern of a single item of purchased product data, at least one pattern of a combination of a plurality of items among items of purchased product data, and priority among these patterns. In the example illustrated in FIG. 19, a combinatorial pattern of items of "model name" and "product category" is illustrated with priority "1" as a combinatorial pattern of a plurality of items among purchased product items. A content of the node display item priority list 124*f* may be previously fixed, or may be changed by a person having authority of changing the content of the node display item priority list 124*f*.

As illustrated in FIG. 18, the storage unit 24 according to the present embodiment stores a product category/model name correspondence table 124*g* indicating correspondence between a product category and a model name of a product.

FIG. 20 illustrates an example of the product category/model name correspondence table 124*g*.

The product category/model name correspondence table 124*g* illustrated in FIG. 20 is a table indicating correspondence between a product category and a model name of a product. It is obvious from the product category/model name correspondence table 124*g* that there is a case that a plurality of model names may exist in a single product category while a plurality of product categories does not exist for a single model name. That is, it is obvious that the product category is a higher category of the model name. A content of the product category/model name correspondence table 124*g* may be previously fixed, or may be changed by a person having authority of changing the content of the product category/model name correspondence table 124*g*.

Since the node display item priority list 124*f* includes a combinatorial pattern of the items of "model name" and "product category," the storage unit 24 according to the present embodiment stores the product category/model name correspondence table 124*g* as information indicating correspondence among a plurality of items in the pattern. When a combinatorial pattern of a plurality of items is included in the node display item priority list 124*f*, the storage unit 24 according to the present embodiment needs to store information indicating correspondence among a plurality of items in the pattern.

Next, an operation of the system according to the present embodiment will be described.

The operation of the system according to the present embodiment is the same as the operation of the system 10 according to the first embodiment except for the operation to display a hierarchical structure for displaying purchased product data.

An operation of the system according to the present embodiment when displaying the hierarchical structure for displaying the purchased product data will be described.

A user of the data management apparatus 20 (hereinafter, referred to as a "target user" in the description of the operation of the system according to the present embodiment when displaying the hierarchical structure) can log in to the data management apparatus 20 via the operating unit 31 of the data utilization apparatus 30 by using a user ID of the target user. When the hierarchical structure notification unit 25*b* of the data management apparatus 20 permits the target user to log in, the operation illustrated in FIG. 21 is performed.

FIG. 21 is a flowchart of an operation of the data management apparatus 20 when the hierarchical structure is to be notified.

The operation illustrated in FIG. 21 is similar to an operation illustrated in FIG. 10 to which processes of S201 and S202 are added.

In the process of S104 of the operation illustrated in FIG. 21, a pattern of an item of the purchased product data, which the target user can access, is a pattern that the target user having reference authority of the values of all the items in the pattern.

As illustrated in FIG. 21, the hierarchical structure notification unit 25*b* determines, after the process of S106, whether the pattern specified in S104 includes a plurality of items (S201).

When the hierarchical structure notification unit 25*b* determines in S201 that the pattern specified in S104 includes a plurality of items, the hierarchical structure notification unit 25*b* generates, as a substitute of an ordinary hierarchical structure, i.e., a substitute hierarchical structure, a hierarchical structure constituted by nodes of which value of an item in the pattern specified in S104 is a display name, and with which the purchased product data including this value is associated, based on the purchased product data specified in S106 and information indicating correspondence among a plurality of items in the pattern specified in S104 (S202). When, for example, the pattern specified in S104 is a combinatorial pattern of the items of "model name" and "product category," the hierarchical structure notification unit 25*b* "model name" is specified as an item which is the lowest category between "model name" and "product category" according to the product category/model name correspondence table 124*g*, and sets the value of the specified "model name" to be the node of the lowest hierarchical level in the substitute hierarchical structure.

When the hierarchical structure notification unit 25*b* determines in S201 that the pattern specified in S104 does not include a plurality of items, the hierarchical structure notification unit 25*b* performs the process of S107.

When the process of S103, S107 or S202 is finished, the hierarchical structure notification unit 25*b* notifies the data utilization apparatus 30 of the hierarchical structure generated in S103, S107 or S202 (S108) and finishes the operation illustrated in FIG. 21.

FIG. 22 illustrates an example of the hierarchical structure displayed by the data utilization apparatus 30 to the user with the user ID of "User789."

According to the user list 24*e*, the user with the user ID of "User789" is an "analyzer." Therefore, according to the authority list 24*d*, the user cannot access the node display name of the node list 24*b*. That is, the hierarchical structure notification unit 25*b* determines in S101 that the user with the user ID of "User789" cannot access the node display name of the node list 24*b*. Among the patterns of the items of the purchased product data, which are accessible by the user with the user ID of "User789" who is an "analyzer," the pattern with the highest priority is is the pattern of priority "1" according to the authority list 24*d* and the node display item priority list 124*f*. That is, the hierarchical structure notification unit 25*b* specifies the pattern of priority "1" in the node display item priority list 124*f* in S104. According to the user list 24*e*, the user with the user ID of "User789" belongs to the node with the node ID of "NODE_02" in the ordinary hierarchical structure. That is, the hierarchical structure notification unit 25*b* specifies the node with the node ID of "NODE_02" in S105, and specifies in S106 all pieces of the purchased product data associated with the node in the hierarchy of the node with the node ID of "NODE_02" or below in the ordinary hierarchical structure. Therefore, in S202, the hierarchical structure notification unit 25b generates, as the hierarchical structure notified to the data utilization apparatus 30 with respect to the user with the user ID of "User789," a substitute hierarchical structure constituted by nodes of which item in the pattern of priority "1" in the node display item priority list 124f, i.e., values of the "model name" and "product category" are the display name, and with which the purchased product data including these values are associated as illustrated in FIG. 22, based on all pieces of the purchased product data associated with the node in the hierarchy of the node with the node ID "NODE_02" or below in the ordinary hierarchical structure.

When a combinatorial pattern of a plurality of items is included in the node display item priority list 124f, the storage unit 24 according to the present embodiment does not necessarily have to store information indicating correspondence among a plurality of items in that pattern as a single table. For example, the storage unit 24 according to the present embodiment does not necessarily have to store the product category/model name correspondence table 124g as long as the storage unit 24 stores a list of product categories as illustrated in FIG. 23A and a list of model names for each product category as illustrated in FIG. 23B. Further, the hierarchical structure notification unit 25b may generate, as needed, the product category/model name correspondence table 124g based on the list of product categories as illustrated in FIG. 23A and the list of model names for each product category as illustrated in FIG. 23B.

The data management system of the present disclosure is implemented only by a single data management apparatus in each embodiment described above. However, the data management system may be implemented by a plurality of electronic devices. For example, at least one of the node list, the purchased production list, the authority list, the user list, the node display item priority list, and the product category/ model name correspondence table of the data management apparatus may be stored in an outside electronic device.

The data management system of the present disclosure does not include a data utilization apparatus in each embodiment described above, but may include a data utilization apparatus.

What is claimed is:

1. A data management system comprising:
a control unit arranged to effect control of management of data stored in a storage unit, wherein
the control unit includes:
a data management unit capable of managing a plurality of pieces of the data each of which includes a value for each item;
a hierarchical structure notification unit that notifies a hierarchical structure constituted by a plurality of nodes each of which at least one piece of data is associated with; and
a data notification unit that, when any of the nodes of the hierarchical structure notified by the hierarchical structure notification unit is designated, notifies the value of at least a part of the data associated with the designated node, wherein
the hierarchical structure notification unit
notifies an ordinary hierarchical structure to a person having reference authority of a display name of the node of the ordinary hierarchical structure as the ordinary hierarchical structure,
notifies, as a substitute of the ordinary hierarchical structure, a substitute hierarchical structure to a person not having reference authority of the display name of the node of the ordinary hierarchical structure, and
the substitute hierarchical structure is constituted by nodes of which value of at least one item is a display name and with which the data including this value is associated.

2. The data management system according to claim 1, wherein
in a pattern indicated in pattern information indicating at least one of at least one pattern of a single item and at least one pattern of a combination of a plurality of items, the hierarchical structure notification unit specifies the pattern that a person not having reference authority of the display name of the node of the normal hierarchical structure has authority to refer to all the values of items, and notifies the substitute hierarchical structure constituted by nodes of which values of all items in the specified pattern are display names, and with which the data including these values is associated.

3. The data management system according to claim 2, wherein
the pattern information indicates the pattern with priority, when notifying the substitute hierarchical structure to a person not having reference authority of the display name of the node of the ordinary hierarchical structure, specifies the pattern having the highest priority, the person having the reference authority of the values of all the items.

4. A non-transitory computer readable medium having stored therein a data management program causing a computer to execute:
a data management unit capable of managing a plurality of pieces of data each of which includes a value for each item;
a hierarchical structure notification unit that notifies a hierarchical structure constituted by a plurality of nodes each of which at least one piece of data is associated with; and
a data notification unit that, when any of the nodes of the hierarchical structure notified by the hierarchical structure notification unit is designated, notifies the value of at least a part of the data associated with the designated node, wherein
the hierarchical structure notification unit
notifies an ordinary hierarchical structure to a person having reference authority of a display name of the node of the ordinary hierarchical structure as the ordinary hierarchical structure,
notifies, as a substitute of the ordinary hierarchical structure, a substitute hierarchical structure to a person not having reference authority of the display name of the node of the ordinary hierarchical structure, and
the substitute hierarchical structure is constituted by the nodes of which value of at least one item is a display name and with which the data including this value is associated.

* * * * *